(12) United States Patent
Navarro (10) Patent No.: US 6,505,639 B1
(45) Date of Patent: Jan. 14, 2003

(54) HYGIENIC THREE WAY VALVE

(76) Inventor: Ramon Munoz Navarro, 4829 E. Walnut Ave., Orange, CA (US) 92856

( * ) Notice: Subject to any disclaimer, the term of this patent is extended or adjusted under 35 U.S.C. 154(b) by 0 days.

(21) Appl. No.: 09/642,888

(22) Filed: Aug. 22, 2000

Related U.S. Application Data (60) Provisional application No. 60/168,678, filed on Dec. 3, 1999.

(51) Int. Cl.⁷ .............................. G01M 3/08; B08B 3/02; B08B 9/032
(52) U.S. Cl. ................ 137/312; 137/15.05; 137/15.06; 137/15.11; 137/312; 137/315.09; 137/625.5; 251/63.5; 92/13.8
(58) Field of Search ................ 137/238, 240, 137/241, 312, 597, 625.48, 625.5, 15.05, 15.06, 15.11, 315.09; 92/13.8; 251/63.5, 63.6

(56) References Cited

U.S. PATENT DOCUMENTS

| | | | |
|---|---|---|---|
| 2,010,129 A | * 8/1935 | Baker ........................ | 92/13.8 |
| 3,122,065 A | * 2/1964 | Laun ........................ | 137/625.5 |
| 3,260,504 A | * 7/1966 | Mojonnier et al. ........ | 137/625.5 |
| 3,307,574 A | * 3/1967 | Anderson .................. | 137/312 |
| 3,512,550 A | * 5/1970 | Ammann ................... | 92/13.8 |
| 3,517,688 A | * 6/1970 | Scholle ...................... | 137/240 |
| 3,838,707 A | * 10/1974 | Wachowitz, Jr. .......... | 137/312 |
| 3,999,932 A | 12/1976 | Matthews | |
| 4,052,997 A | * 10/1977 | De Lorenzo et al. ..... | 137/312 |
| 4,306,586 A | 12/1981 | Spencer | |
| 4,365,754 A | * 12/1982 | Levine et al. ............. | 251/63.5 |
| 4,518,021 A | 5/1985 | Copas et al. | |
| 4,535,821 A | 8/1985 | Anderson | |
| 4,648,874 A | 3/1987 | Kurtz et al. | |
| 4,660,591 A | * 4/1987 | Brown et al. .............. | 137/312 |
| 4,888,979 A | 12/1989 | Steeper | |
| 5,082,021 A | 1/1992 | Yonezawa | |
| 5,102,094 A | * 4/1992 | Washam et al. ........... | 92/13.8 |
| 5,152,320 A | * 10/1992 | Zimmerly .................. | 137/625.5 |
| 5,232,023 A | * 8/1993 | Zimmerly .................. | 137/637.2 |
| 5,263,682 A | * 11/1993 | Covert et al. .............. | 251/214 |
| 5,469,880 A | * 11/1995 | Zimmerly .................. | 137/240 |
| 5,535,923 A | 7/1996 | Fujioka | |
| 5,810,045 A | * 9/1998 | Evans ........................ | 137/312 |

* cited by examiner

*Primary Examiner*—George L. Walton
(74) *Attorney, Agent, or Firm*—William D. Breneman; Peter J. Georges; Breneman & Georges

(57) ABSTRACT

The invention pertains to a hygienic three way valve for dispensing medicinal, pharmaceutical and food products or other fluid materials which require the processing of fill products without contamination while providing a positive control over the the fill product. The novel hygienic three way valve provides a positive control over fill products by utilizing a fluid activated piston having a positive shut off provided by a substantially cylindrical sealing head in combination with tapered sealing seats that receive the upper and lower sealing surfaces of the substantially cylindrical sealing head. A pneumatic or fluid means is provided for activating the piston and a leak detection port is disposed through the wall of the main valve body communicating with the piston. A first seal is disposed between the leak detection port and the product chamber and a second seal disposed between the leak detection port and the piston activation means to prevent the contamination of fill products with fluid activation means for activating the piston. The novel hygienic three way valve is preferably composed of at least three separable components which are preferably assembled together with flange clamps.

42 Claims, 7 Drawing Sheets

HYGIENIC THREE WAY VALVE

This application claims benefits of 60/168,678, filed Dec. 3, 1999.

BACKGROUND OF THE INVENTION

1. Field of the Invention

The invention pertains to a three way valve having a positive shut off valve for mixing or diverting a flowable material. More particularly, the novel hygienic three way valve is provided for mixing or diverting flowable materials while avoiding contamination of the flowable material by employing a positive controlled valve having a tapered valve seat of a substantially frustro-conical configuration in combination with a substantially cylindrical piston sealing head actuated by a piston positively controlled by fluid activation.

The fluid activated piston of the novel hygienic three way valve preferably employs a pneumatically controlled piston having a pneumatic activation chamber at one end and a product chamber at the other end. The pneumatically activated piston is disposed through the valve body, which valve body includes a leak detection port disposed between the pneumatic activation chamber and the product chamber with a first sealing means disposed between the leak detection port and the pneumatic activation chamber and a second sealing means disposed between the product chamber and the leak detection port.

The leak detection port, in combination with the first and second sealing means not only provides early detection of seal failure but also identifies the location of the defective seal without allowing contamination of the fill material with contaminants in the pneumatic air or activation fluids in the chamber for activating the positive controlled piston. The combination of the air or fluid in the activation chamber with cups on the piston allows the piston to not only positively open and close the valves, but also to assume an infinite number of positions between the valves.

The novel hygienic three way valve not only prevents contamination of the flowable fill material with the fluids used to activate the positive controlled piston for opening and closing the positive control valve, but also provides for the mixing or diversion of fluids introduced to the three way valve by utilizing a second tapered valve seat having a substantially frustro-conical configuration disposed axially adjacent to the first tapered valve seat to utilize both an upper and lower portion of the substantially cylindrical piston sealing surfaces of the sealing head attached to the positively controlled piston.

The first and second tapered sealing seats are disposed in a mixing or diversion chamber disposed below an inlet chamber communicating with a product introduction port. A second port communicates with the mixing or diversion chamber intermediate the first and second sealing seats to provide a mixing or diversion chamber which also communicates with an outlet port. The novel hygienic three way valve is preferably segmented into a fluid cylinder or chamber for housing the positive controlled piston activation means, a main body, having a first or inlet product chamber and a second or product mixing or diversion chamber, and a port disposed intermediate the tapered ends of the mixing or diversion chamber and an outlet port in axial alignment with the mixing or diversion chamber.

The novel three way hygienic valve includes, in the preferred application, flanged connections between the fluid activation chamber, the main body of the three way valve, and the outlet port. In addition, flanges are provided for interconnections between the first inlet port leading to the first product chamber and the product port communicating with the second product chamber, as well as at both ends of the outlet port. Optionally, the main body can be further segmented and additional flange connections can be provided between the first product chamber and the second product chamber, as well as the provision of additional mixing chambers along the axial length of the sealing piston, as well as additional sealing heads of decreasing diameters disposed axially along the length of the novel hygienic valve. The combination of axial aligned sealing heads in such applications can provide a plurality of mixing and/or diversion zones in the novel valve, as well as providing a positive shut off of all of the mixing chambers from the outlet nozzle by the retraction of the positively controlled piston for controlling multiple valves.

The novel hygienic mixing or diversion valve of the invention may include a plurality first and second seals for providing a determination of seal failure and a plurality of leak detection ports between the various axially aligned mixing or diversion chambers. The novel hygienic three way valve is preferably constructed of a seamless material, such as stainless steel, glass or other material that can be easily cleaned and has a smooth, seamless surface that prevents the build-up of bacteria or other contaminants that would have a deleterious effect upon fill products requiring the highest hygienic handling consistent with food, medical and pharmaceutical preparations and processing.

2. Description of Related Prior Art

A wide variety of product mixing or diversion valves are known in the prior art. Some of these diversion valves are made of stainless steel, glass and other seamless materials, but these prior art diversion valves do not include a positive shutoff valve provided by a pneumatically activated piston having a sealing head of a substantially cylindrical configuration in combination with a pair of tapered sealing seats of a frusto conical configuration in combination with a leak detection port for providing a positive identification of seal failure before deterioration of the seal has resulted in contamination of a fill product with the fluid for activation of the piston.

In the prior art, seal failure has resulted in the contamination of the fill product with the fluids for activating the product valve piston. The fluids typically utilized in the food processing industry have been partially pneumatically controlled and partially spring controlled pistons and when such prior art pistons fail, the fill product is contaminated with pressurized air from an air pressure source and the contaminants generally found in pressurized air which typically include dust, bacteria, oil and other small particulate matter as well as lubricants employed with springs in the piston activation chamber. Typically, such seal failures have resulted in shutting down the production line and in some cases, recall of defectively packaged products.

None of the know prior three way mixing and diversion valves have provided a positive leak detection means for providing advanced warning of a seal failure or provided a failsafe seal that would prevent the contamination of the fill product with the pneumatic fluid pressure and spring combination for operating the product dispensing piston. Further, none of the known prior art utilizes a positive control valve in combination with the pneumatic piston, which provides a tapered seat for positively controlling the dispensation of a fill product without displaying some dripping or bleed through of product around the piston. Such problems are common in the food processing industry, where stainless steel pistons are typically utilized to exert pressures on compressible fluids utilized to dispense a flowable product which is obviated by the present invention in allowing the piston to free float and not compress the fluid when the piston is operated in applications where closure of one of the valves is not required. Further in the prior art stainless steel pistons have not utilized a rubber or an elastomeric sealing head in combination with tapered sealing seats disposed in the path of flow of the dispensed flowable product.

In a prior art search no patents were uncovered utilizing a novel three way valve similar to that of the present invention with a leak detection port. Instead prior art was uncovered pertaining to leak detection ports and devices and three way valves. The most relevant prior art pertinent to leak detection ports pertained to leak detection devices used in gas flow applications such as Matthews U.S. Pat. No. 3,999,932, Kurtz, et al U.S. Pat. No. 4,648,874 and Steeper et al U.S. Pat. No. 4,888,979. None of these prior art leak detection patents teach or suggest the utilization of a leak detection port in combination with a product mixing or diversion valve.

None of the known prior art leak detection port devices employs a double seal arrangement in combination with a mixing or diversion valve piston to prevent the contamination of a processed product. The closest known prior art is Steeper U.S. Pat. No. 4,888,979, which discloses a leak detection port across an O-ring flanged connection. The leak detection port provided in Steeper U.S. Pat. No. 4,888,979 pertains to a leak detection port for indicating leaks radially along the O-ring as opposed to axially along the length of the piston as is provided in accordance with the novel fill valve assembly of the invention.

The most relevant patent uncovered pertaining to diverter or three way valves in the prior art most pertinent to the present invention is Copas, et al U.S. Pat. No. 4,518,021 which pertains to a machine for filling containers which, like the present invention, provides for the flanged connections for the various components. Copas, et al U.S. Pat. No. 4,518,021 in col. 8, lines 6–19, describes the utilization and operation of the diverter valve but does not describe the diverter valve other than to describe it as manually operable. The other prior art patents uncovered pertinent to three way valves include Fujioka U.S. Pat. No. 5,535,923, Yonezawa U.S. Pat. No. 5,082,021, Spencer U.S. Pat. No. 4,306,586 and Anderson U.S. Pat. No. 4,535,821. These prior art patents include provisions for directing fluids from port to port without contamination, pressure activated piston valves and beverage pouring apparatus. However, each of the valve devices are patently distinct from the novel three way valve of the invention.

SUMMARY OF THE INVENTION

The invention pertains to a novel three way valve, particularly suited for applications involving the mixing or diversion of flowable products requiring hygienic treatment, such as are encountered in the pharmaceutical, medicinal and food handling industries. More particularly, the novel three way valve provides positive control over mixing and diversion of fluid materials by employing a positive control pneumatically activated valve formed by a piston having a substantially cylindrical head in combination with one or more tapered seats for cooperating with the substantially cylindrical head to provide precise control over fluid products, such as medicine formulations, milk, yogurt and other dairy products and beverages. The novel three way valve is positively controlled by air pressure to open or close each valve but also can utilize differential pressures in the piston activation chamber to free float between the tapered valve seats when desired. The novel three way valve is preferably composed of stainless steel or other material that is substantially free from threads, seams, welds or other surface imperfections that would foster the growth of bacteria or other deleterious substances.

The novel three way valve utilizes a fluid activated piston for positively mating in at least one valve seat to form a valve provided by the combination of the substantially cylindrical sealing head of the piston, in combination with at least one tapered sealing seat in the novel three way valve. In the preferred application, a pair of tapered sealing seats in axial alignment are provided in the novel three way valve to provide a first and second valve by cooperating with a double sided sealing head of the piston by utilizing the bottom of the substantially cylindrical piston head and the top of the substantially cylindrical head in response to the pneumatic activation of the mixing valve piston. The mixing valve piston with the substantially cylindrical piston head, can be operated to maintain the substantially cylindrical piston head intermediate the axially aligned tapered sealing seats by utilizing differential air pressure in the piston activation chamber in relation to the density of the processed fluid product to provide a turbulence generating mechanism to assist in the mixing of fluid in the mixing valve embodiment of the novel product three way valve.

The novel product three way valve is preferably composed of a main valve body, a pneumatic chamber for activating the product valve piston and an outlet port having a tapered seat for providing one of the tapered seats for the novel three way valve. The main body includes, at one end, a flange for mating with a corresponding flange of a pneumatic chamber or cylinder for activating the pneumatically controlled piston and at the other end, a flange for accommodating the product outlet containing one of the tapered sealing seats for the pneumatically controlled piston. The novel product three way valve includes at least two product input ports for receiving products to be either mixed or diverted in the novel three way product valve.

The novel three way product valve is particularly adapted for hygienic filling and mixing operations and includes a leak detection port for identifying the precise position of a defective seal before products introduced into the novel three way valve can become contaminated in filling or product diversion operations. The leak detection port is provided in the novel three way valve in the main valve housing at a point intermediate the attachment of the piston valve actuating chamber and a first product chamber disposed in the novel three way valve body. A first seal is provided intermediate the first product chamber and the leak detection port and a second seal is provided intermediate the leak detection port and the pneumatic piston activation chamber. The leak detection port in combination with the seals provides a positive identification of the location of a defective seal as being either the first or the second seal and at the same time, prevents contamination of either the processed product or the pneumatic air chamber by utilizing the other seal as a failsafe system to prevent bypass of air or product to prevent contamination.

The novel three way valve main body includes a first product processing chamber in axial alignment with a second processing chamber and a first tapered sealing seat intermediate the first product chamber and the second product chamber. A first port communicates with the first product processing chamber and a second port communicates with the second product processing chamber. The product processing piston with the sealing head is designed to be positioned in at least two different positions in the second product processing chamber and provide closure of the first product processing chamber from the second processing chamber by seating in the first tapered sealing seat or to seal the second tapered sealing seat at the other end of the second product processing chamber. Alternatively, the product processing piston is also designed to operate to either free float or be positively controlled by air in piston activation chamber to assume positions intermediate the first and second tapered sealing seats in the second product processing chamber to assist in the mixing or diversion of fluids in the second product processing chamber.

The novel three way valve not only provides for diversion and mixing of fluids in the processing chamber, but also provides for the hygienic handling of fluid material, such as medicinal products, food products, beverages and other fluid materials by preventing the contamination of processed products with the fluid utilized to activate the pneumatic piston. Flanges connecting the components assist in cleaning and maintenance operations which, together with the composition of the stainless steel used for the construction of the valve, assists in cleaning operations. The positive identification of deterioration of the seal prevents the packaging and possible shipment of contaminated product, which would subsequently require expensive recall of defectively filled or contaminated packaged products.

BRIEF DESCRIPTION OF THE DRAWINGS

The advantages of the invention will become more apparent to those skilled in the art in conjunction with the detailed description of the preferred embodiment of the invention with the drawings in which.

DETAILED DESCRIPTION OF THE PREFERRED EMBODIMENT

The novel three way valve provides positive control over the diversion and mixing of fluid materials and in particular, materials requiring the highest standards of hygienic handling, such as yogurt, milk, ice cream and other such flowable food products as well as medicines and pharmaceutical products. The novel three way valve further provides for preventing the contamination of products processed or handled in the novel three way valve with fluid or other pneumatic activation means utilized to activate the piston for providing positive control over the valves in the respective pneumatic and product processing chambers of the novel three way valve. In addition, the failsafe leak detection port not only provides positive identification of the location of seal failure, but also provides a back-up secondary seal that provides back-up protection against contamination of the fluid for activating the piston as well as the product processed in the novel three way valve.

The novel three way valve is preferably made of stainless steel or other material providing for the highest purity and hygienic standards for the sanitary dispensation of flowable materials. As such, the novel three way valve is typically made of high grade stainless steel that is noncorrosive and is without seams, threads, welds or other surface imperfections that would allow the accumulation or accretion of any particles that would have a deleterious effect upon handled products. Further, in the preferred embodiment of the invention, the three major portions of the novel three way valve are held together with flanges to avoid the use of threads or seams that would otherwise provide surfaces or crevices for the growth of contaminants or other deleterious bacteria or substances that might otherwise contaminate a hygienically handled flowable product.

Figure 1:
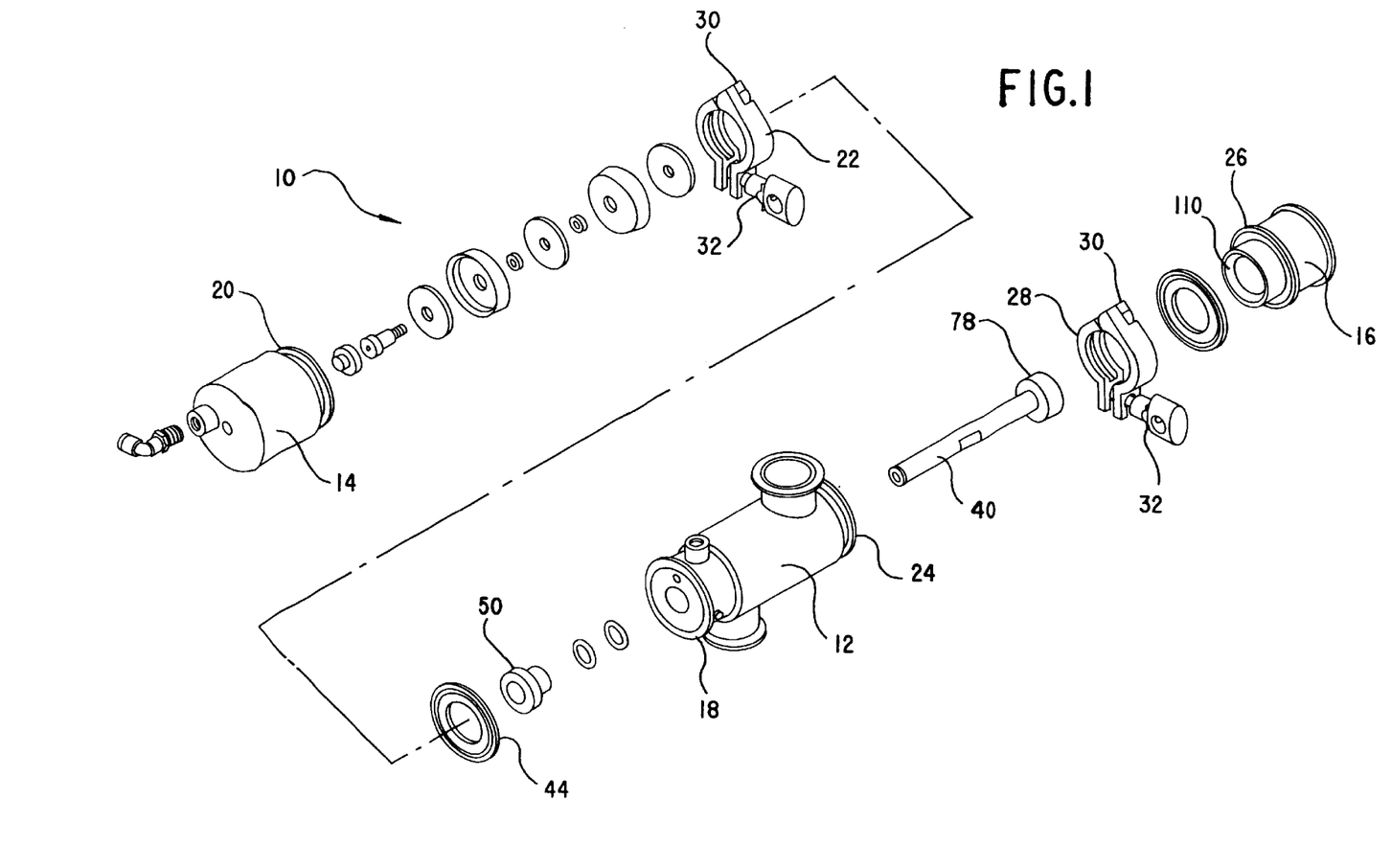
FIG. 1 is an exploded view of the preferred embodiment of the novel three way valve of the invention.

Referring now to FIG. 1 the best mode of the novel three way valve 10 is illustrated which includes a main valve body 12, a cylinder housing 14 and a valve seat port 16. In the preferred embodiment of the invention, the main valve body 12 includes a flange 18 for mating with a corresponding flange 20 on the cylinder housing 14. A flange clamp 22 is utilized to maintain cylinder housing 14 in connection with main valve body 12. Similarly, a flange 24 is provided on the other end of main cylinder body 12 for mating with a corresponding flange 26 disposed on valve seat port 16. A flange clamp 28 is similarly provided for maintaining main valve body 12 in contact with valve seat port 16. Flange clamp 22 and 28 are preferably triclover flange clamps as are manufactured by Triclover Inc. of Kenosha, Wis. The triclover clamps 22 and 28 are preferably pivoted at joint 30 and include an adjustable key nut 32 for firmly securing the flange clamp around flanges 24 and 26 and flange 18 and 20 to provide a novel three way valve with fluid tight seals.

Figure 1A:
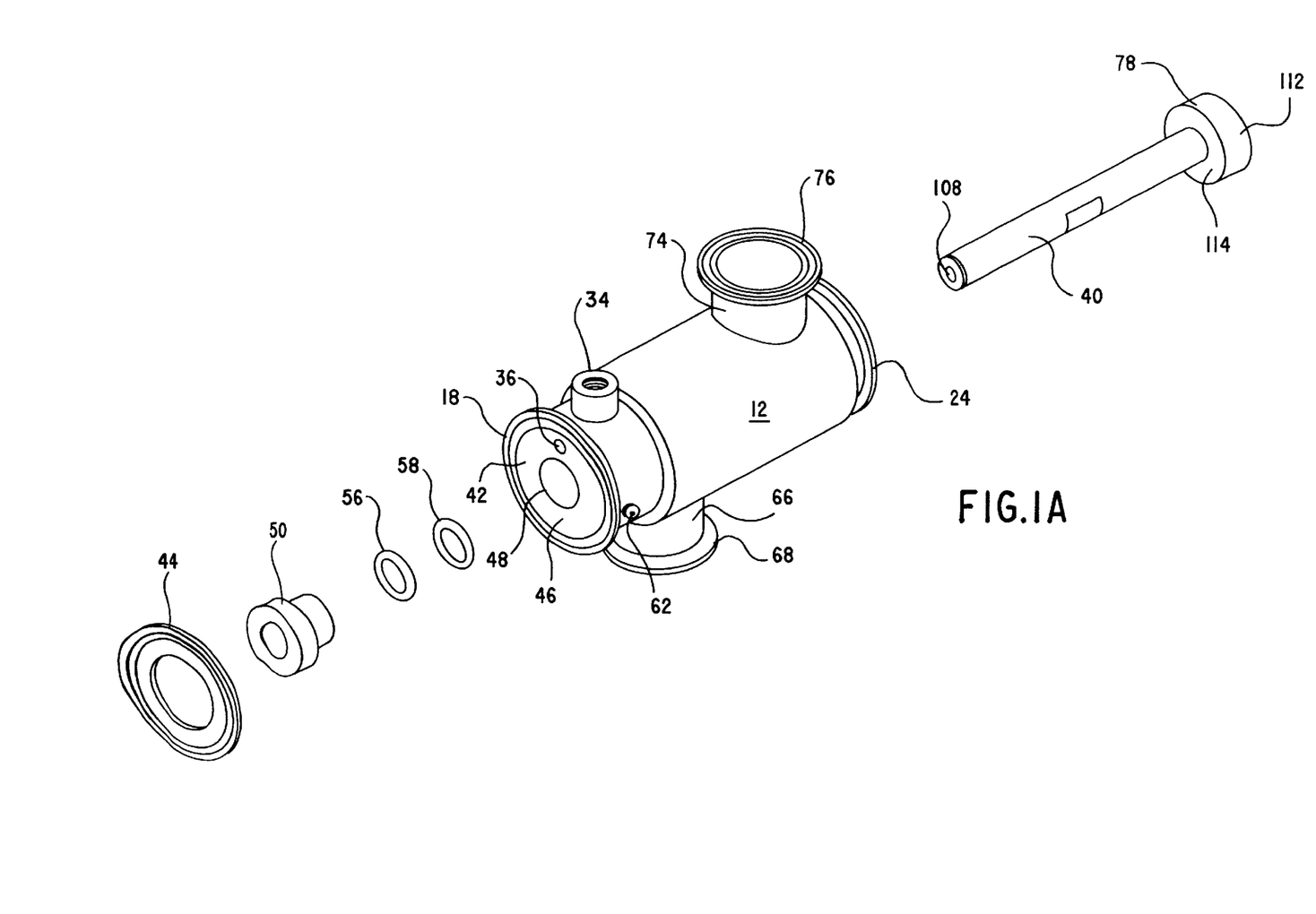
FIGS. 1A, 1B and 1C is an exploded view similar to FIG. 1, illustrating the components of the novel three way valve of FIG.1 in greater detail.
Figure 2:
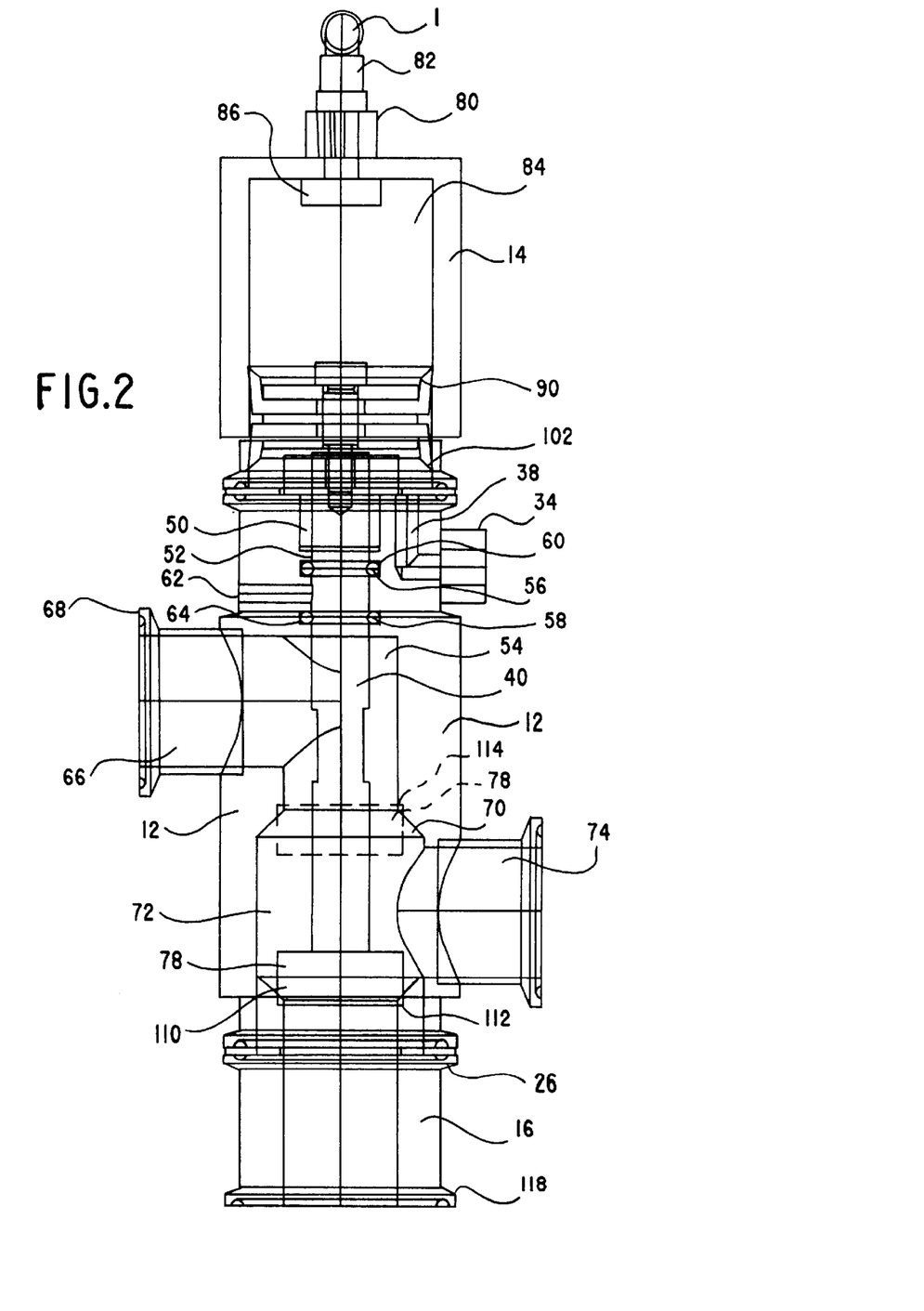
FIG. 2 is a side elevational view of the novel three way valve of FIGS. 1, 1A, 1B and 1C, partly in section illustrating various sealing and mixing positions in accordance with the best mode of the invention for the sealing head of the product processing piston.

Referring now to FIGS. 1, 1A and 2, the main valve body 12 includes an air pressure port 34 for receiving a standard air pressure fitting (not shown). Air pressure port 34 is connected to pressure port 36 via channel 38 (FIG. 3) to provide activation of piston rod 40 in a manner that will be described hereinafter in greater detail.

Flange 18 of main valve body 12 includes an O-ring recess 42 for receiving an O-ring seal 44 for providing an air tight seal when clamp 22 is secured around flange 18 and 20. Flange 18 further includes a support plate 46 and an opening 48 for receiving a bushing 50 to assist in the positioning of piston rod 40 in a passage 52 in which piston rod 40 is disposed between first chamber 54 of main valve body 12 and cylinder housing 14. Bushing 50 is preferably composed of a plastic material providing close tolerance around piston rod 40 and is preferably composed of a half delrin and half Teflon composition to not only provide a slick surface for the movement of piston rod 40 in passage 52, but also increase the service life of bushing 50.

An O-ring 56 is provided in seat 60 for providing a seal between leak detection port 62 and cylinder housing 14. A second O-ring 58 is provided in seat 64 disposed between leak detection port 62 and first chamber 54. Two O-ring seals may be utilized either between the leak detection port and the cylinder housing 14 or the first chamber 54. Preferably the double O-ring application utilizes the two O-ring seals between the leak detection port 62 and the first chamber 54. O-ring seals 56 and 58 are preferably quad seal rings, as may be obtained from McMaster, Inc. of Norwalk, Calif.

First chamber 54 in main valve body 12 is connected to port 66, which preferably terminates in a flange 68, which may be connected to a product inlet corresponding flange (not shown) by means of a flange clamp similar to those previously described. Port 66 provides for the entrance or exit of a flowable product from first chamber 54. First chamber 54 terminates in a tapered valve seat 70, which separates first chamber 54 from second chamber 72. Second chamber 72 is connected to port 74, which preferably includes a flange 76 provided in valve seat port 16 which is connected to main valve body 12 by flange clamp 28. Port 74 also includes a corresponding flange connected by a flange clamp to a reservoir (not shown) for introducing or providing for the diversion of a fluid from second chamber 72 to provide for mixing or diversion depending upon the position of sealing head 78 of piston rod 40 in a manner that will be described hereinafter in greater detail.

Figure 1B:
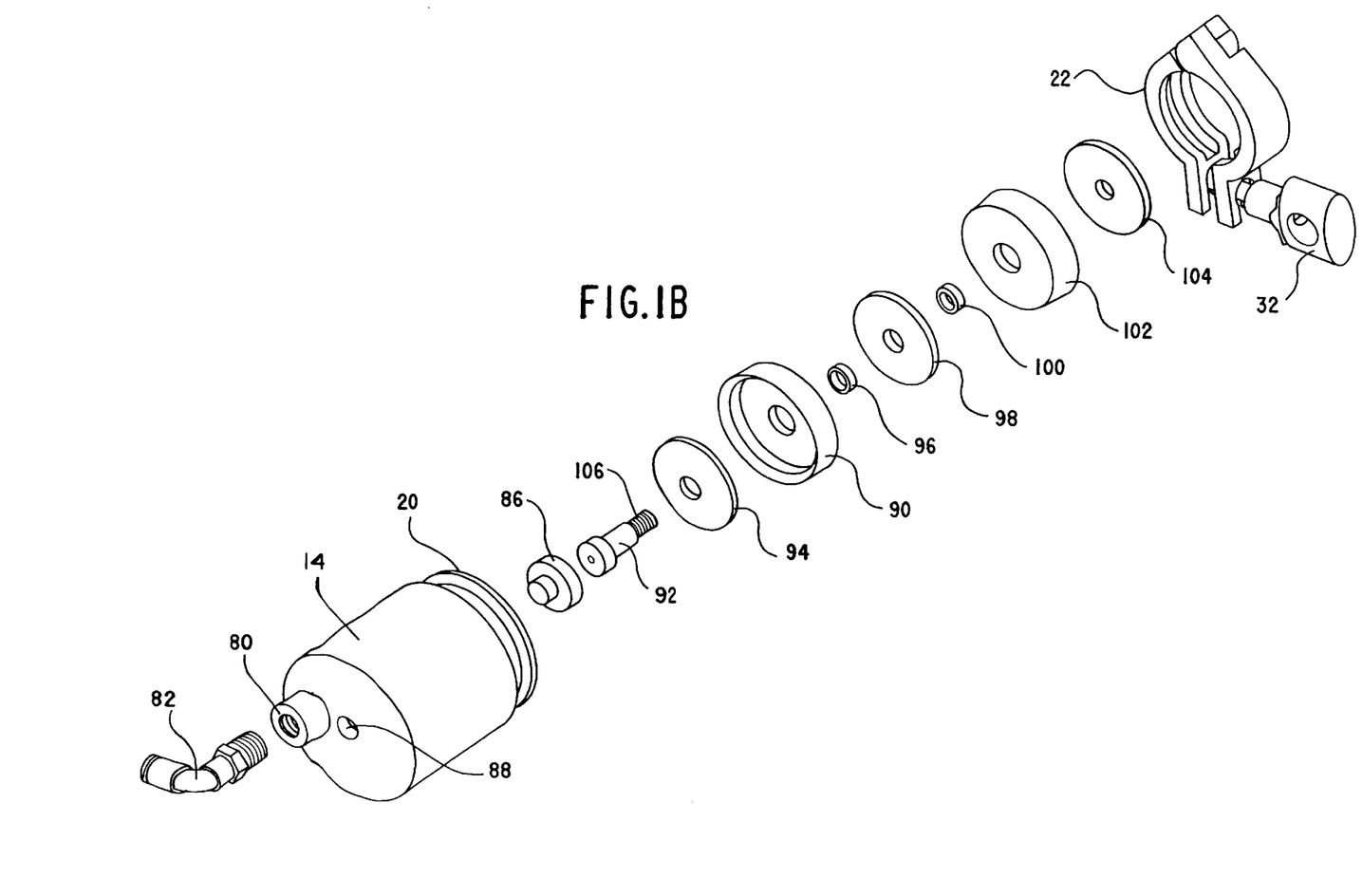

Referring now to FIGS. 1, 1B and 2, the activation of piston rod 40 is provided by air pressure introduced into cylinder housing 14. Cylinder housing 14 includes an air pressure inlet 80, which provides for the threaded engagement for an air pressure fitting 82 for introducing air pressure into chamber 84 of cylinder housing 14. A pad 86 is disposed in cylinder housing 14 through opening 88, which may include threads to provide for the optional adjustment for positioning piston 40 in chambers 84 and 72.

Air pressure introduced to air pressure inlet 80 exerts fluid pressure on pressure cup or piston 90, which is threadably attached to piston rod 40 by screw 92, through washer 94, ring 96, washer 98, second ring 100, pressure cup 102 and washer 104. Threads 106 of screw 92 are received by corresponding threads 108 (FIG. 1A) of piston rod 40. As a result, when air pressure is introduced into chamber 84 of cylinder housing 14, piston rod 40 is pushed down into cylinder housing 14 to force sealing head 78 down into tapered valve seat 110 in valve seat port 16 (FIG. 2). Alternatively, when air pressure is introduced through air pressure fitting 34 and through passage 38 and out through pressure port 36, pressure cup or piston 102 is pushed up into cylinder housing 14 causing sealing head 72 to seat in tapered valve seat 70, as illustrated in dotted lines in FIG. 3. Sealing head 78 includes a bottom sealing surface 112 and a top sealing surface 114 to provide a fluid tight seal in tapered valve seat 110 and tapered valve seat 70, respectively.

As will be recognized by those skilled in the art, air pressure chamber 84 controls the position of sealing head 78 in second chamber 72. This provides numerous advantages in not only providing for positive sealing in tapered valve seat 70 and tapered valve seat 110, but also for maintaining sealing head 78 in any desired intermediate position. This is particularly advantageous where liquids of varying temperature, density, viscosity and compressibility are dispensed since the difference in air pressure introduced through pressure inlet 80 and/or pressure port 34 can be used to control the position of sealing head 78 in relation to the density, viscosity and compressibility of the processed fluid. This is particularly the case where foods, such as ice cream, are processed in the novel three way valve since temperature of the ice cream varies the density and viscosity of the processed product.

Figure 1C:
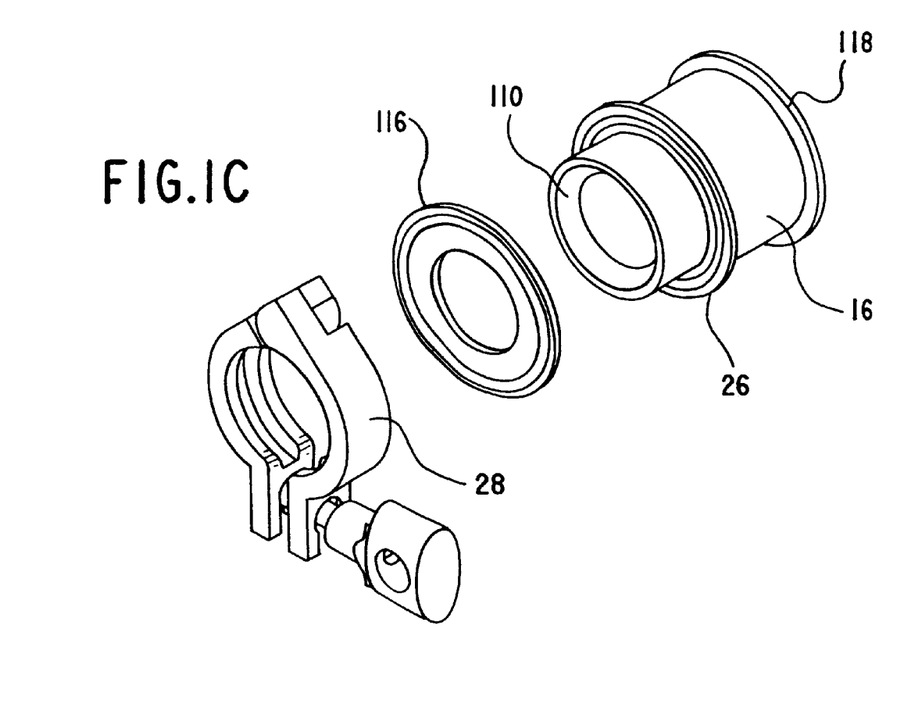

Referring now to FIGS. 1 and 1C, valve seat port 16 includes tapered valve seat 110 for accommodating bottom sealing surface 112 of sealing head 78. Valve seat port 16 includes a flange 26 for mating with corresponding flange 24 of main valve body 12. An O-ring gasket 116 is provided to maintain a fluid tight seal between main valve body 12 and valve seat port 16. Valve seat port 16 also preferably includes a flange 118 for connecting to an outlet port or nozzle for dispensing a product mixed or processed in the novel three way valve.

Figure 3:
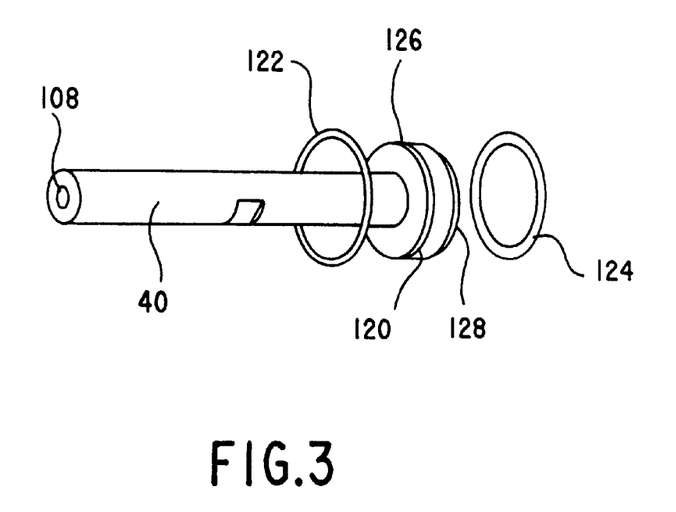
FIG. 3 is an exploded view of an alternative embodiment of the sealing head of the product processing piston.

Referring now to FIG. 3, a modified sealing head 120 is illustrated connected to piston rod 40 for operation in the novel three way valve 10. Modified sealing head 120 may be made of an elastomeric material or be made of stainless steel with one or more rubber O-ring inserts 122 and 124 which are held in place by a grovoe 126 and 128 in modified piston head 120 to provide sealing in tapered valve seat 70 and 110. The sealing head 78 provided on piston rod 40 can be modified in a number of ways in combination with the tapered sealing seats 70 and 110 to provide a fluid tight seal in a variety of ways known to those skilled in the art to provide a fluid tight seal to suit particular requirements.

The novel three way valve is preferably interconnected with flanges to assist in maintain a sanitary and hygienic connection between the various parts of the three way valves as well as the interconnection with the various ports leading into and out of the novel three way valve. All the connections in contact with flowable food or medicinal products are preferably smooth and devoid of cracks, seams, welds or other surface imperfections that would harbor bacteria, dirt or other deleterious substances to maintaining the highest purity standards for food, medical and pharmaceutical processing standards. Further the flanges provided in the various input and exit ports of the novel three way valve can be attached to a corresponding flange on a cleaning device to pump fluid in, around and through the novel hygienic three way valve.

Figure 4:
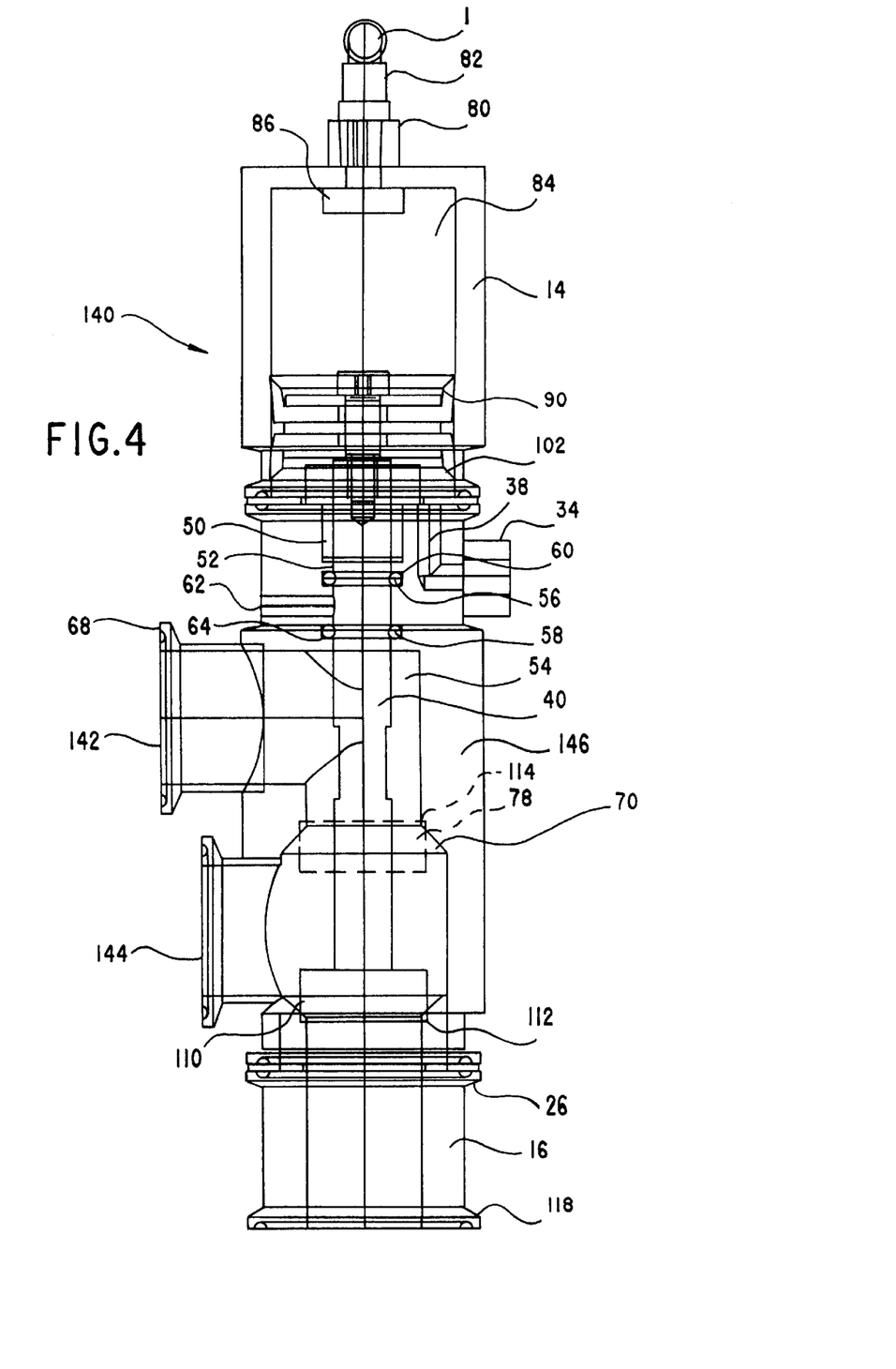
FIG. 4 is a schematic elevational view of an alternative embodiment of the main valve body with the ports in a different orientation.

Referring now to FIG. 4, a novel three way valve 140 is illustrated with ports 142 and 144 oriented on main valve body 146 in a different radial arrangement than ports 66 and 74 or main valve body 12. The operation of piston rod 40 as well as the tapered valve seats 70 and 110 operate in a similar manner as heretofore described. As will be recognized the orientation of ports 142 and 144 can be modified both radially and axially to suit particular requirements and the length of piston rod can be modified to accommodate particular requirements.

The novel hygienic three way valve in operation provides not only for the mixing of products in the second chamber by utilizing the sealing head 78 to provide a disturbance in the flow of the product, but also allows for use as a diversion valve, depending upon the application of the novel three way valve. As heretofore discussed, piston rod 40 can seal port 66 from port 74 by closing tapered valve seat 70 with top sealing surface 114 of sealing head 78. Alternatively, sealing head 78 can close port 160 from port 66 and 74 by closing tapered valve seat 110 in valve sealing port 16 to provide diversion of product introduced into port 66 out through 74 where diversion of product rather than mixing is desired in the novel three way valve.

Alternatively, the novel three way valve can be utilized for mixing product introduced through port 66 and through port 74 in second chamber 72 by maintaining piston rod 40 and sealing head 78 in an intermediate position between tapered valve seat 70 and tapered seat 110. The novel hygienic three way valve 10 can thereby be utilized either for mixing two different fluids in second chamber 72 and discharging the mixed product through port 160 or can be utilized for diversion of product between port 66 and port 74. As heretofore discussed, the novel hygienic three way valve allows for easy cleaning operation by the pumping of fluid through port 160, port 74 or port 66 to clean chambers 54 and 72, as welt as sealing head 78 and the tapered valve seats 110 and 70.

The novel hygienic three way valve provides numerous advantages over prior art valves by not only providing a positive control over the mixing and diversion of fluids introduced into the three way valve, but also provides for easy cleaning of the hygienic valve, as well as providing a leak detection port for preventing the contamination of fill product introduced into the novel three way valve with air pressure or fluids utilized to activate the novel hygienic three way valve. The novel hygienic three way valve further can be used in multiple types of mixing and diversion applications to achieve the advantages of the invention and the components of the novel three way valve can be changed or modified to suit particular requirements.

Numerous modifications may be made in the components of the three way valve as well as the activation of the piston and the materials utilized for the sealing head, as well as modifications in the sealing head itself. In addition, numerous modifications and changes may be made as to the precise location and disposition of the novel leak detection port for preventing contamination of food product with piston activation fluids as well as the location and disposition of the ports to suit particular arrangements and machine requirements. These and other modifications as are made by those skilled in the art are deemed to be included within the scope of the claims.

As used herein and in the following claims, the word 'comprising' or 'comprises' is used in its American technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated that these and other modifications can be made within the scope of the invention as defined in the following claims.

What is claimed is:

1. A three-way valve comprising:
   (a) a fluid product dispensation housing having at one end a piston activation housing and an outlet port at the other end and an elongated product chamber and a cylindrical passage connecting said outlet port with said elongated product chamber and a first inlet port and a second inlet port communicating with said elongated product chamber disposed intermediate said piston activation housing and said outlet port;
   (b) a piston rod disposed in a substantially confronting cylindrical piston rod wall portion in said cylindrical passage said piston rod having a sealing head disposed on said piston rod, said sealing head having a diameter greater than said piston rod and disposed in said elongated product chamber intermediate said first inlet port and said second inlet port;
   (c) a tapered wall in said elongated product chamber intermediate said first inlet port and said second inlet port said tapered wall forming a sealing seat for said sealing head;
   (d) a leak detection port disposed in said fluid product dispensation housing connecting a portion of said substantially confronting cylindrical piston wall portion of said cylindrical passage with an ambient environment said leak detection port providing an unsealed piston rod and substantially confronting cylindrical piston rod wall to always openly connect a portion of said cylindrical piston rod wall to said ambient environment;
   (e) a first fixed seal disposed intermediate said leak detection port and said elongated product chamber, said first fixed seal having a hole therethrough for surrounding said piston rod and sealing said elongated product chamber from said leak detection port;
   (f) a second fixed seal disposed intermediate said leak detection port and said piston activation chamber, said second fixed seal having a hole therethrough for surrounding said piston rod and sealing said piston activation housing from said leak detection port;
   (g) a piston activation housing having pneumatic means for maintaining positive control of said sealing head with respect to said first inlet port and said second inlet port and said sealing seat for accurately dispensing fluid products having a variety of physical properties related to density, temperature and pumping pressure through said outlet while providing a positive indication as to seal failure as between said first seal and said second seal to prevent cross contamination between products dispensed through said outlet and fluid within and said pneumatic means.

2. The three-way valve of claim 1 further comprising a threaded adjustment means on said piston activation housing to adjust the position of said piston rod in said substantially confronting cylindrical piston rod wall.

3. The three-way valve of claim 1 wherein said tapered wall tapers inwardly to form an inwardly tapering sealing seat.

4. The three-way valve of claim 1 further comprising an enlarged chamber in said elongated product chamber intermediate said outlet port and said first inlet port.

5. The three-way valve of claim 4 wherein said sealing head is of a diameter smaller than said enlarged chamber and is of a diameter greater than said sealing seat.

6. The three-way valve of claim 5 wherein said enlarged chamber tapers inwardly at the top of said enlarged chamber intermediate said first inlet port and said second inlet port to form a second sealing seat.

7. The three way valve of claim 6 wherein said piston includes a second sealing head on the side opposite said first sealing head.

8. The three-way valve of claim 7 wherein said cylindrical passage, said first inlet port, said second inlet port and said enlarged chamber are without seams or threads.

9. The three-way valve of claim 7 wherein said outlet is detachable from said fluid product dispensation housing.

10. The three-way valve of claim 9 wherein said outlet is attached to said fluid product dispensation housing with a flange clamp.

11. The three-way valve of claim 10 wherein said piston activation housing is detachable from said fluid product dispensation housing.

12. The three-way valve of claim 11 wherein said piston activation housing is attached to said fluid product dispensation housing with flange clamp.

13. The three-way valve of claim 10 further comprising a third port communicating with said outlet port through said said cylindrical passage.

14. The three way valve of claim 13 wherein said third port communicates with said enlarged chamber.

15. The three-way valve of claim 14 wherein said enlarged chamber is in axial alignment with said cylindrical passage.

16. A three-way product valve comprising:
   (a) a three-way valve housing having a passage therethrough said passage having at one end an outlet and a substantially confronting piston rod wall at the other end and a first product chamber and a second product chamber disposed intermediate said outlet and said substantially confronting piston cylinder wall;

(b) a piston rod having a substantially uniform diameter for seating in said substantially confronting piston rod wall said piston rod having a sealing head disposed intermediate said first product chamber and said second product chamber said sealing head having a diameter greater than the diameter of said piston rod;

(c) a tapered sealing seat in said three-way valve housing for seating said sealing head;

(d) a piston activation housing having fluid means for activating said sealing head of said piston rod to an open position, a closed position, and an infinite number of positions therebetween;

(e) mechanical means on said piston activation housing for setting said sealing head of said piston rod at one of said infinite positions;

(f) a first inlet communicating with said first product chamber and said outlet;

(g) a second inlet communicating with said second product chamber and said outlet;

(h) a leak detection port in said three-way valve housing communicating with said substantially confronting piston rod wall and said piston rod through a hole in said three-way valve housing to at all times openly connect a portion of said substantially confronting piston rod wall and said piston rod with an ambient environment outside of said three-way valve housing irrespective of the position of said piston rod;

(i) a first seal disposed in said three-way valve housing intermediate said leak detection port and said piston activation housing; and (j) a second seal disposed in said three-way valve intermediate said leak detection port and said first product chamber wherein said fluid means for activating said piston rod maintains positive control over the position of said sealing head for accurately dispensing fluid products having a variety of physical characteristics related to density, temperature, and pumping pressure while said leak detection port provides an immediate indication of seal failure irrespective of the position of said piston rod.

17. The three-way product valve of claim 16 further comprising a second tapered sealing seat disposed intermediate said first product chamber and said second product chamber and in axial alignment with said tapered sealing seat.

18. The three-way product valve of claim 17 wherein said sealing head includes an upper and lower sealing surface.

19. The three-way product valve of claim 16 wherein said three-way valve housing, said piston activation housing and said outlet are joined together with flange clamps.

20. The three-way product valve of claim 19 wherein said tapered sealing seat is disposed in said outlet.

21. The three-way product valve of claim 20 wherein said fluid means for activating said piston rod is pneumatic means.

22. The three-way product valve of claim 21 wherein said pneumatic means includes an air cup attached to the end of said piston rod.

23. The three-way product valve of claim 22 wherein said piston activation cylinder housing includes a pneumatic inlet port communicating with said piston activation cylinder housing.

24. A three-way fluid processing valve comprising:

(a) a three-way valve housing having at one end a flange for mounting a piston activation housing having activation means for activating a piston rod and at the other end a product outlet flange and a substantially confronting piston rod wall passage at the other end;

(b) a first product chamber communicating with said confronting piston cylinder passage;

(c) a second product chamber of a diameter greater than said first product chamber communicating with said first product chamber and said product outlet flange;

(d) a piston rod of a substantially uniform diameter disposed in said substantially confronting piston rod wall passage;

(e) a sealing head disposed on said piston rod and maintained in said second product chamber;

(f) a first tapered sealing seat disposed intermediate said first chamber and said second chamber;

(g) a second tapered sealing seat disposed intermediate said second chamber and said outlet flange;

(h) a leak detection port communicating with said substantially confronting piston rod wall passage through a hole in said three-way valve housing to at all times openly connect a portion of said substantially confronting piston rod wall passage and said piston rod with an ambient environment outside of said three-way valve housing irrespective of the position of said piston rod;

(i) a first fixed seal disposed in said substantially confronting piston rod wall passage intermediate said leak detection port and said piston activation housing;

(j) a second fixed seal disposed in said substantially confronting piston rod wall passage intermediate said leak detection port and said first chamber said combination of said piston rod, said leak detection port and said first fixed seal and said second fixed seal providing a positive indication of seal failure between said first fixed seal and said second fixed seal irrespective of the position of said piston rod in said substantially confronting piston rod wall passage so as to prevent cross contamination between products dispensed and fluid in said fluid activation means.

25. The three-way fluid processing valve of claim 24 further comprising an outlet fitting.

26. The three-way fluid processing valve of claim 25 wherein said second tapered sealing seat is disposed in said outlet fitting.

27. The three-way fluid processing valve of claim 26 further comprising a port having a flange communicating with said first chamber.

28. The three-way fluid processing valve of claim 27 further comprising a port having a flange communicating with said second chamber.

29. The three-way fluid processing valve of claim 28 wherein said piston rod includes a sealing head having upper and lower sealing surfaces.

30. The three-way fluid processing valve of claim 29 wherein said upper and lower sealing surfaces are composed of an elastomeric material.

31. The three-way fluid processing valve of claim 30 wherein said fluid activation means for activating said sealing head is pneumatically activated and employs an air cup attached to the end of said piston rod.

32. The three-way fluid processing valve of claim 31 wherein said piston activation housing includes an air inlet and means for adjusting the position of said piston rod in said substantially confronting piston rod wall passage.

33. The three-way fluid processing valve of claim 32 wherein said means for adjusting the position of said piston rod in said substantially confronting piston rod wall passage is pneumatically controlled.

34. The fluid processing valve of claim 32 further comprising a pneumatic inlet port in said piston activation housing communicating with an air cup attached to the end of said piston rod.

35. The three-way fluid processing valve of claim 28 wherein said port having a flange communicating with said first product chamber and said port having a flange communicating with said second product chamber are disposed on the same side of said three-way valve housing.

36. The three-way fluid processing valve of claim 28 wherein said port having a flange communicating with said first product chamber and said port communicating with said second product chamber are disposed on the opposite sides of said three-way valve housing.

37. A process for the hygienic processing of fluids comprising;

(a) pumping a fluid material into a body of a three-way valve having at one end a piston activation housing and an outlet port at the other end and a first and a second chamber disposed intermediate said piston activation housing and said outlet port;

(b) pneumatically operating a piston rod having a sealing head in said three-way valve to open and close said first and said second chamber and pneumatically controlling the position of said sealing head at an infinite number of positions therebetween to maintain positive control over the sealing head to accurately dispense products having a variety of physical characteristics related to density, temperature and pumping pressure;

(c) providing a leak detection port between the means for pneumatically operating said piston rod and said body of said three way valve to openly connect said leak detection port with an ambient environment to allow identification of the location of a seal failure as between a first seal and a second seal irrespective of the position of said piston rod;

(d) utilizing a first seal between said leak detection port and said piston activation housing for pneumatically operating said piston 21 rod and;

(e) utilizing a second seal between said leak detection port and said first chamber wherein said first seal, said second seal and said leak detection port provide a positive indication of seal failure to prevent cross contamination of said fluid material with pneumatic air pressure fluid in said piston activation housing.

38. The process of claim 37 further comprising the step of placing flanges on all ports on the three way valve.

39. The process of claim 37 further comprising the step of providing means for adjusting the position of said pneumatically operated piston in said second chamber.

40. The process of claim 39 wherein said means for adjusting the position of said pneumatically operated piston is pneumatically controlled.

41. The process of claim 37 wherein said pumping of a fluid material is a dairy product.

42. The process of claim 41 wherein said dairy product is yogurt.

* * * * *